United States Patent [19]

Shenoy et al.

[11] 4,179,455
[45] Dec. 18, 1979

[54] PROCESS FOR THE PRODUCTION OF MODIFIED VEGETABLE FATS

[75] Inventors: Raghuram D. Shenoy; Anantharam Ganapathy, both of Bombay, India

[73] Assignee: Cadbury India Limited, Bombay, India

[21] Appl. No.: 872,145

[22] Filed: Jan. 25, 1978

[51] Int. Cl.² .................. C11C 3/12; A23D 5/00; A23G 1/00
[52] U.S. Cl. .................. 260/409; 260/424; 426/417; 426/607
[58] Field of Search .......... 260/409, 424, 428; 426/417, 607

[56] References Cited

U.S. PATENT DOCUMENTS

| | | | |
|---|---|---|---|
| 3,012,891 | 12/1961 | Best et al. | 426/607 |
| 3,431,116 | 3/1969 | Feuge | 260/409 |
| 4,006,264 | 2/1977 | Gooding | 426/607 |
| 4,041,188 | 9/1977 | Cottier et al. | 426/607 |
| 4,060,646 | 11/1977 | Bringi et al. | 426/607 |

FOREIGN PATENT DOCUMENTS 443058  9/1974  U.S.S.R. .................. 260/424

*Primary Examiner*—P. E. Konopka
*Attorney, Agent, or Firm*—Ladas, Parry, Von Gehr, Goldsmith & Deschamps

[57] ABSTRACT

A new process is provided for the production of modified vegetable fats comprising the steps of partially hydrogenating a refined, bleached and deodorized vegetable fat selected from the group which consists of sal seed fat, Mowrah fat, phulwara fat and mixtures thereof in the presence of a conventional metal catalyst to obtain hardened fat; allowing the hardened fat to remain for 3 to 4 days at a temperature of 20° to 35° C.; and then subjecting the hardened fat to hydraulic pressure with a range of 200 to 700 p.s.i. under a controlled temperature range of about 20° to 35° C.

9 Claims, 4 Drawing Figures

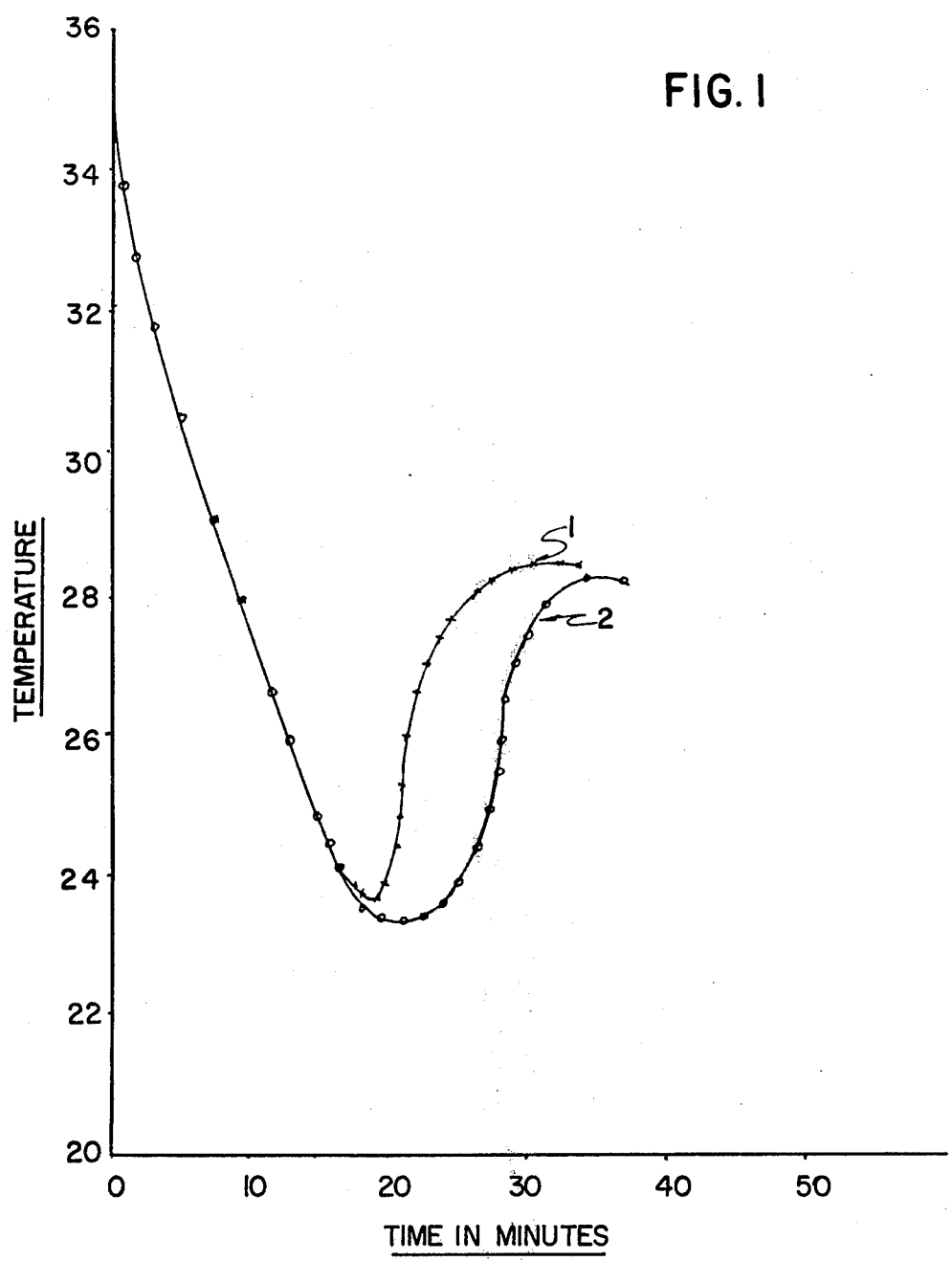

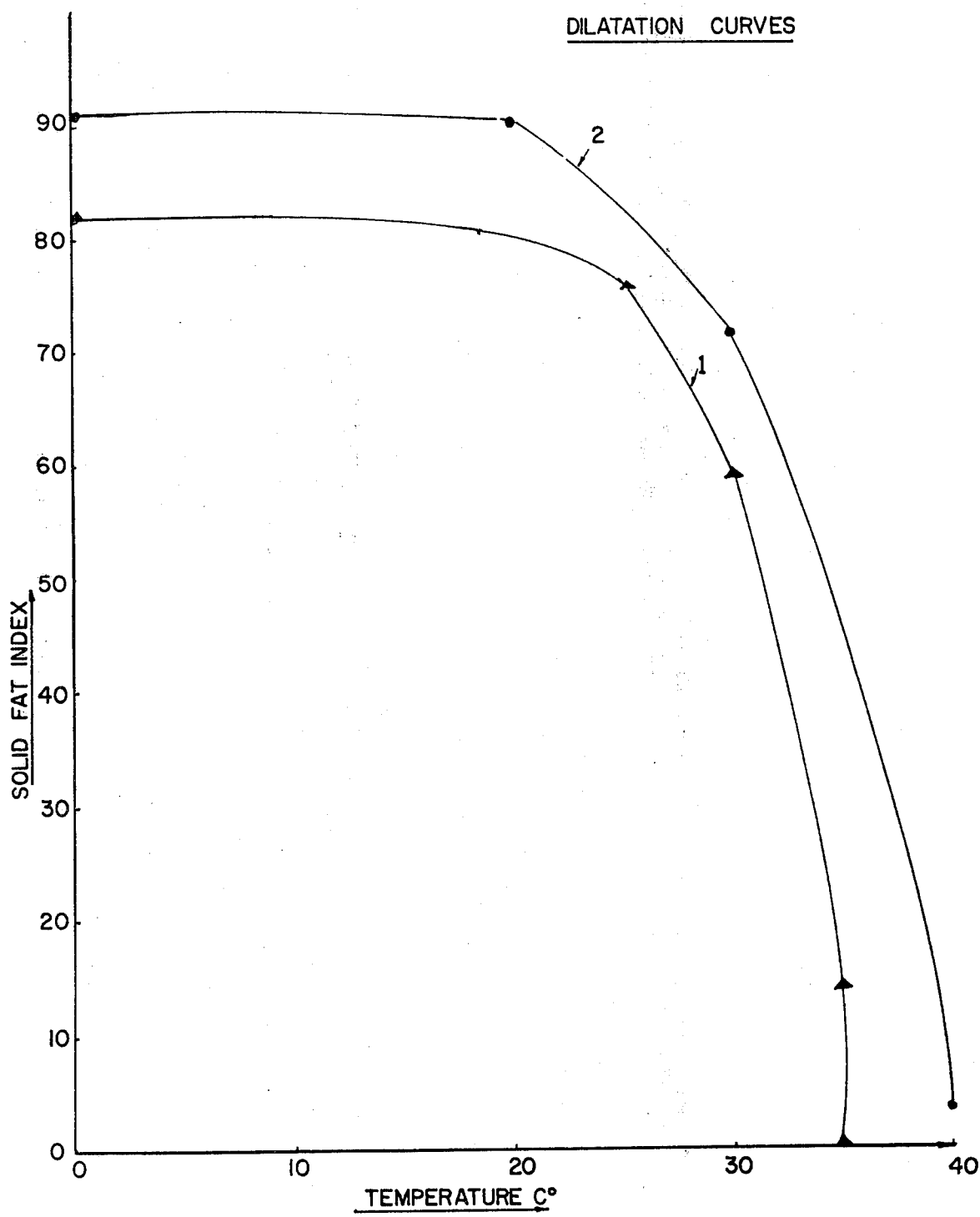

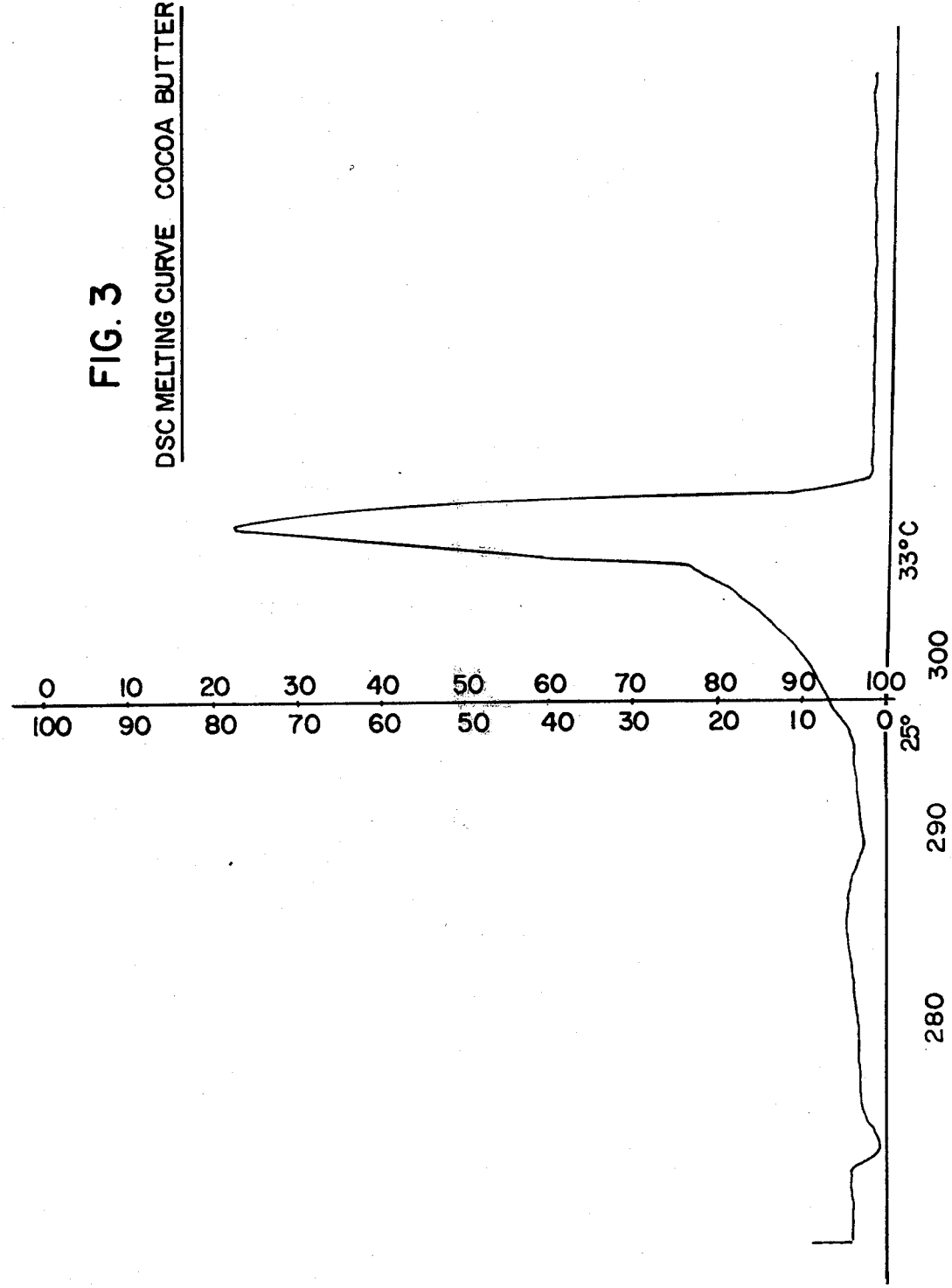

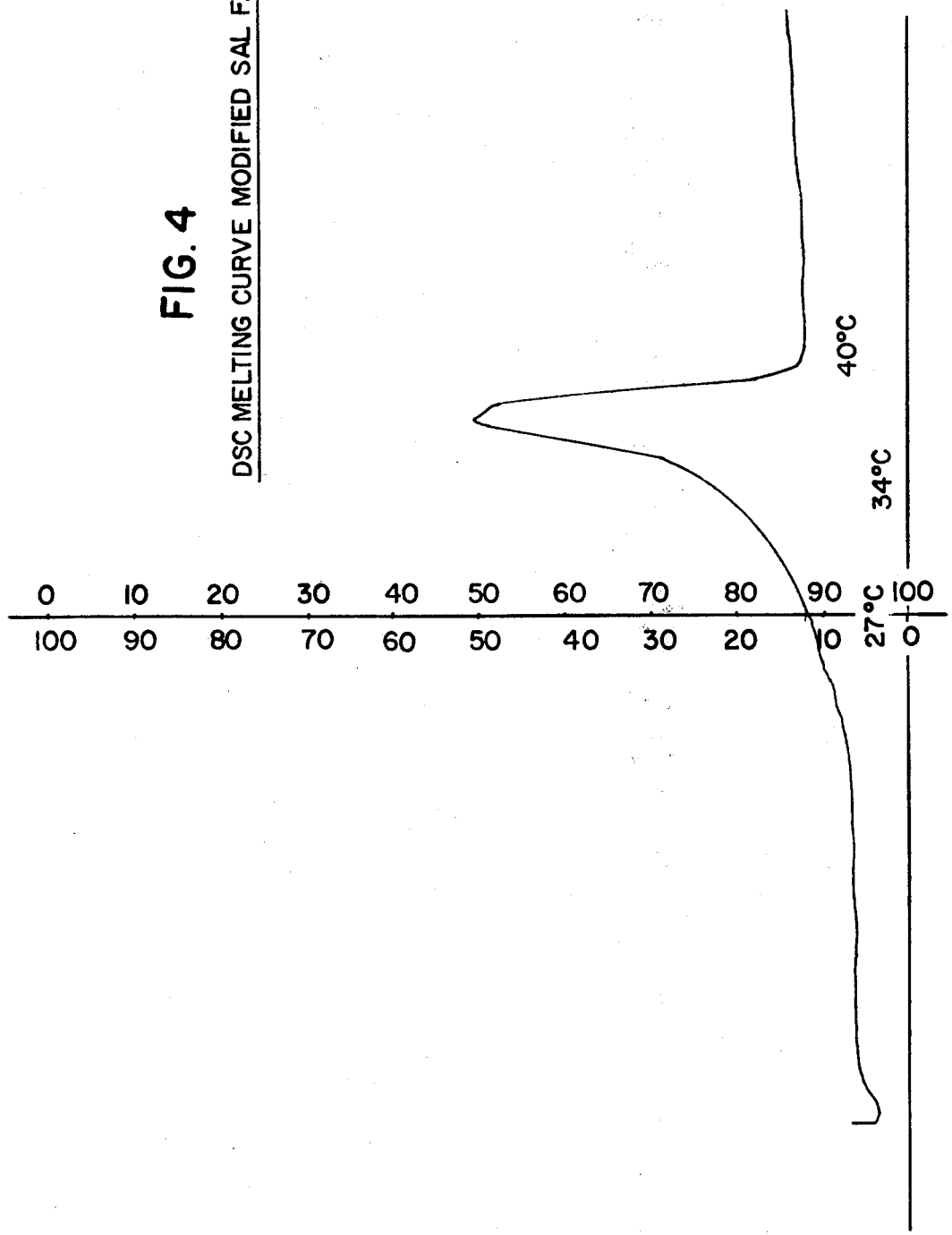

PROCESS FOR THE PRODUCTION OF MODIFIED VEGETABLE FATS

This invention relates to a process for the production of modified vegetable fats from natural vegetable fat which is solid or semi-solid.

The modified fat obtained according to the invention has a high melting stearine fraction capable of replacing at least part of the cocoa butter present in chocolate and other confectionery products and of raising the melting point of chocolates and chocolates products.

Cocoa butter, the natural fat of cocoa bean (Theobroma Cacao L) is an essential constituent of all chocolates and confectionery products. In the manufacture of high quality chocolates the roasted cocoa bean is shelled and the nib ground. To this ground nib, which is called cocoa liquor are added sugar, milk solids, cocoa butter, emulsifiers and flavourings. The physical characteristics of such chocolates arise mainly from the cocoa butter present. Cocoa butter melts completely at 35° C. or slightly below body temperature; it is a hard brittle solid at normal room temperatures. Cocoa butter is used in chocolates and confectionery products largely because its physical properties contribute to glossy coatings, absence of waxiness and favourable volume changes in the moulding operation.

A great deal of research work has been done by various workers to develop a substitute for at least part of the cocoa butter added during the manufacture of chocolate, a fat which can be used to make chocolate from partly or completely defatted ground cocoa bean or as a coating for confections. Oils and fats containing essentially $C_{16}$ and $C_{18}$ fatty acids would logically be preferred as raw materials for making cocoa butter substitutes. Most common of these are palm oil, cottonseed oil, Borneo tallow and mowrah fat.

It is the object of the present invention to provide a modified fat compatible with cocoa butter and having the following physical characteristics when admixed with cocoa butter and milk fat:
1. A very short melting range.
2. melting readily in the mouth without having a waxy taste.
3. quickly hardening
4. resistance to formation of grey cast and surface bloom.
5. compatibility with defatted cocoa powder, cocoa liquor and milk fat individually or in a mixture
and
6. controlled shrinkage during cooling for satisfactory mould release.

The essential characteristics and measurements necessary to determine the quality and suitability of a cocoa butter substitute for use in chocolate manufacture are:
1. Melting behaviour
2. Melting dilatation
3. Hardness
4. Solidification and super cooling characteristics
5. Stability towards oxidative rancidity
and
6. Taste and appearance A further object of the invention is to obtain a modified fat without the undesirable tannins and phenols.

We have found that cocoa butter substitute meeting the above mentioned requirements can be prepared from a vegetable butter, known as *Shorea Robusta Seed Fat*, containing substantial quantities of both disaturated and diunsaturated glycerides of $C_{16}$, $C_{18}$ and $C_{20}$ acids.

Sal, botanically known as *Shorea Robusta*, grows abundantly in the States of Madhya Pradesh, Uttar Pradesh, Orissa and Bihar.

Cocoa butter is hard and brittle at 30° C. Unlike this, sal fat is greasy at this temperature. This fat crystallises in a coarse and grainy crystalline mass, occluding some amount of liquid fat which tends to separate out on standing. For this reason, sal fat cannot be used as a complete substitute for cocoa butter, even though it melts within a narrow range of 36° C.–38° C.

According to the present invention there is provided a process for the production of modified vegetable fats which comprises partially hydrogenating a refined, bleached and deodorised vegetable fat in the presence of a conventional metal catalyst to obtain hardened fat and subjecting the so hardened fat to hydraulic pressures within a range of 200–700 p.s.i., under a controlled temperature range of about 20° C. to 35° C.

The vegetable fat prepared according to the present invention contains a hard stearine fraction uniform in its consistency and free from low melting triglycerides. The purpose of partial hydrogenation is to harden the liquid fat that separates out from the crystallised sal fat thereby making the fat more stable towards oxidative rancidity and uniform in its consistency. The iodine value of raw sal fat varies from 38 to 45. This variation in iodine number is due to the varying amounts of glycerides of polyunsaturated fatty acids present in the raw fat.

The hydrogenation is carried out using a conventional metal catalyst such as nickel, copper, palladium, platinum or a complex catalyst such as copper-chromium using a support Kieselguhr or any other diatomaceous earth. The amount of catalyst used is not critical and may be varied, say from 0.02% to 5% by weight or even more, but the usual range is 0.01 to 2%. The hydrogenation reaction is preferably carried out using a supported fresh nickel catalyst and the suitable temperature range is from about 100° C.–190° C. The reaction is carried out at pressures preferably not exceeding 50 p.s.i. and more preferably between atmospheric and 35 p.s.i. The time of hydrogenation may vary e.g. from about 10 minutes to about an hour or more according to the iodine value of the raw material. The hydrogenated fat should preferably contain less than 2% of trisaturated glycerides. A suitable temperature range for solidifying the hardened fat lies between 20° C. to 35° C. at which temperature the hardened fat in a molten condition is held for 3 to 4 days for complete solidification before subjecting it to hydraulic pressing.

Hydraulic pressing of the solidified fat is carried out using a conventional hydraulic press, at controlled temperatures and at pressures preferably within the range 200–700 p.s.i. Pressure is applied for a sufficient length of time for drainage of liquid oil e.g. from about 30 minutes to about an hour or more. The process of hydraulic pressing of the solidified fat according to this invention is carried out under a controlled temperature range similar to that of the solidified fat itself i.e., 20° C. to 35° C.

The hydraulic pressing of solidified fat according to our invention is so devised that 2% to 10% of the low-melting triglycerides by weight of the solidified fat is removed. The resulting hard stearine fraction is compatible with cocoa butter and possesses excellent shelf-life.

Undesirable tanning and phelons, with special reference to ellagic acid, are present in the raw vegetable fats, for example in raw sal fat. Ellagitannins are complex ester glycosides and occur largely in myrobalans and oak galls.

According to the present invention, in order to remove ellagic acid and ellagitannins from raw vegetable fat viz., raw sal fat, a reagent containing sodium acetate and acetic acid buffer (pH 4.5) is used. (Indian Patent application No. 415/Bom/76). This reagent is added to the raw sal fat to an extent of 0.5% to 2% by weight as a 10% solution. This reagent complexes the ellagic acid present in raw sal fat and removes it in the present novel refining process. The removal of ellagic acid from raw sal fat by this procedure was confirmed by using spectrophotometric techniques.

According to this invention other vegetable fats such as mowrah, phulwara, mango kernel and the like can also be used as starting materials individually or in combination with one another or with sal fat for preparation of a cocoa butter extender by adopting similar steps such as partial hydrogenation and solidification followed by hydraulic pressing.

The following example in which all parts are by weight illustrates the invention:

EXAMPLE

A sample of raw sal fat was treated with sodium acetate-acetic acid reagent and then washed with warm water.

On analysis by spectrophotometry it was noticed that after the pre-treatment of raw sal fat with sodium acetate-acetic acid reagent the absorbance at 255 m$\mu$ and 366 m$\mu$, with reference to phenols similar to ellagic acid and ellagitannins was found to have undergone a sharp reduction.

Neutralisation of the degummed sal fat was carried out successfully with 10% aqueous caustic soda solution at 40° C.

The acid value of the neutralised fat was 0.15. Bleaching of the neutralised fat was carried out at 80° C. using activated earth (2% to 5%) and activated carbon (0.2 to 1%) under high vacuum.

The refined and bleached sal fat was then hydrogenated at 148° C. in the presence of 0.2% of a fresh nickel catalyst containing 20% Ni on Kieselguhr at a guage pressure of 25 p.s.i. for a period of 30 minutes in a pressure vessel with stirring, until the iodine value of the fat reached the desired range 35 to 38. Under these conditions of hydrogenation the transisomer content of the product, measured by infra-red absorption spectrophotometry was less than 5% of the total hydrogenated material. The hydrogenated fat was filtered to remove the Nickel catalyst and then post bleached to remove traces of Nickel using bleaching earth. The hardened fat was completely melted and then solidified by cooling at controlled temperatures held for 4 days. The solidified fat was then subjected to a hydraulic pressure at 500 p.s.i. in order to squeeze out the liquid oil. After a sufficient length of time for drainage of the oil, the pressure was released and the high melting stearine cake so obtained was subjected to deodorisation. Yield of the stearine fraction thus obtained was 95% to 98% in repeated trials on the basis of hydrogenated refined and bleached fat.

The high melting stearine so obtained melts sharply at about 38.5° C. This is higher than that of cocoa butter by about 3°–4° C. a desirable characteristic for tropical countries. The hard stearine fraction contains one-third unsaturated acids, mainly oleic, which gives it a similarity to cocoa butter although the palmitic-stearic acid ratio is reversed.

For some applications as a coating or confectionery fat, higher melting characteristics than those exhibited by cocoa butter may be required. By blending the hard stearine with cocoa butter, the melting range of cocoa butter can be raised effectively. The hard stearine fraction possesses many of the properties required for multi-purpose confectionery and bakery fats. Its thermal characteristics indicate that it is compatible with cocoa butter in wide proportions. It is neutral and bland in flavour and low in polyunsaturated acids which should give it good oxidation stability. The hard stearine is distinguished by exceptional hardness and mechanical strength.

The hard stearine possesses superior resistance to blooming and dulling. This fat exhibited a temperature rise of 4° C. on solidification as compared with 4.9° C. for cocoa butter.

The modified vegetable hard stearine was then tested for cooling curve (FIG. 1), dilatation (FIG. 2), fatty acid composition (Table 2) and thermal profile by differential acanning calorimetry (FIG. 4) and cocoa butter (for comparison) (FIG. 3).

The melting properties of fats are commonly defined by their dilatations at the temperature concerned, dilatation being the insothermal melting expansion expressed in cubic millimetres and referred to 25 grams of material. The dilatation of a fat gives an indication of the solids content of the fat at a particular temperature within its melting range. The dilatation tests were carried out by cooling the melted fat to 0° C. for 90 minutes, tempering it for 48 hours at 26° C. and again cooling to 0° C. before measuring the dilatation at various temperatures. The dilatation results for the hard butter extender along with that of cocoa butter are given in Table 1.

Table - 1

| $D_t$ | Modified Fat | Cocoa Butter |
|---|---|---|
| $D_{20}$ | 2260 | 2040 |
| $D_{25}$ | 2020 | 1900 |
| $D_{30}$ | 1810 | 1490 |
| $D_{35}$ | 350 | 20 |
| $D_{40}$ | 85 | 1 |
| $D_{45}$ | 0 | 0 |

The Jensen cooling curve of the hard butter extender was determined as follows:

About 75 g of sample was heated well above its melting point and placed in a test tube (length-10 cm) a glass loop stirrer and a thermometer were inserted and the assembly was immersed in an air bath at 17° C. The sample was stirred at the rate of six strokes per minute until solidification occurred. A similar trial was carried out with a sample of cocoa butter and the cooling curves of temperature against time for each sample was plotted. These curves are shown in FIG. 1 of the drawings accompanying the specification in which curve 1 indicates the temperature rise on solidification in the case of cocoa butter and curve 2 indicates the same for modified fat.

The above mentioned modified vegetable fat comprising of high melting stearine fraction was used at various levels such as 5, 10, 15, 20 and 25% by replacing cocoa butter in the manufacture of chocolates. Chocolates so manufactured were found to have similar physical and moulding characteristics as those of standard chocolates.

We claim:

1. A process for the production of modified vegetable fats which comprises the steps of:
   (a) partially hydrogenating a refined, bleached and deodorized vegetable fat selected from the group which consists of sal seed fat, Mowrah fat, phulwara fat and mixtures thereof in the presence of a conventional metal catalyst to obtain hardened fat of an iodine value in the range of about 35 to 38 and containing less than about 2% of trisaturated glycerides;
   (b) allowing the hardened fat formed during step (a) to remain for 3 to 4 days at a temperature of 20° to 35° C.; and
   (c) following step (b) subjecting the hardened fat to hydraulic pressure within a range of 200 to 700 p.s.i. under a controlled temperature range of about 20° to 35° C. to remove liquid oil.

2. The process defined in claim 1, step (a) wherein the refined, bleached and deodorized vegetable fat is a mixture of sal seed fat with Mowrah fat and/or phulwara fat.

3. The process defined in claim 1, step (a) wherein the partial hydrogenation is carried out at about 100° to 190° C. and at a pressure not exceeding 50 lbs./in$^2$.

4. The process defined in claim 3 wherein the pressure is between atmospheric pressure and 35 lbs./in$^2$.

5. The process defined in claim 1, step (a) wherein the metal catalyst is a supported fresh nickel catalyst.

6. The process defined in claim 1 wherein the hardened fat contains less than 5% transisomer.

7. The process defined in claim 1, step (c) wherein the hydraulic pressure is applied for at least 30 minutes.

8. The process defined in claim 1 wherein prior to step (a) the vegetable fat is treated with a reagent containing a sodium acetate and acetic acid buffer for removal of ellagic acid and ellagitannins.

9. The process defined in claim 1, step (a) wherein the vegetable fat is solid or semi-solid.

* * * * *